United States Patent [19]
McMurray et al.

[11] 3,919,620
[45] Nov. 11, 1975

[54] INVERTER ADAPTIVE LOCK-OUT TECHNIQUE

[75] Inventors: William McMurray, Schenectady, N.Y.; Allan B. Plunkett; Thomas D. Stitt, both of Erie, Pa.

[73] Assignee: General Electric Company, Erie, Pa.

[22] Filed: May 22, 1974

[21] Appl. No.: 472,415

[52] U.S. Cl. .............................. 321/13; 321/45 C
[51] Int. Cl. ..................... H02m 1/18; H02m 7/52
[58] Field of Search ......... 321/11, 12, 13, 14, 45 R, 321/45 C

[56] References Cited
UNITED STATES PATENTS

| | | | |
|---|---|---|---|
| 3,539,900 | 11/1970 | Chausse et al. | 321/13 |
| 3,569,819 | 3/1971 | Martlloff et al. | 321/12 |
| 3,641,421 | 2/1972 | Graf et al. | 321/45 C |
| 3,718,853 | 2/1973 | Graf | 321/12 |
| 3,753,071 | 8/1973 | Engel | 321/12 |
| 3,852,656 | 12/1974 | Bourbeau | 321/13 |

*Primary Examiner*—Gerald Goldberg
*Attorney, Agent, or Firm*—Dana F. Bigelow

[57] ABSTRACT

An impulse commutated inverter is provided with control apparatus for firing a first commutating rectifier, sensing the subsequent flow of capacitor overcharge current in a parallel reset resistor and delaying a fixed time interval after current flow is first sensed before an opposite serially connected commutating rectifier is permitted to fire. The inverter is thus allowed to generate minimum pulse widths to achieve the maximum possible output voltage in pulse width modulation operation without increasing the risk of shoot-through resulting from simultaneous conduction of the two commutating rectifiers.

27 Claims, 12 Drawing Figures

INVERTER ADAPTIVE LOCK-OUT TECHNIQUE

BACKGROUND OF THE INVENTION

This invention relates generally to impulse commutated inverters and more particuarly to control apparatus and circuitry for providing minimum lock-out time for commutating rectifiers during pulse with modulation operation of inverter systems.

This invention is particularly applicable to inverter circuits of the general type shown and described in U.S. Pat. No. 3,207,974 issued to W. McMurrary on Sept. 21, 1965 and assigned to the assignee of the present invention. In inverter circuits of this type direct current electric power is changed, or "inverter," to alternating current by means of load current carrying gate controlled rectifiers such as silicon controlled rectifiers (SCRs) which are commutated "OFF" by commutating circuitry including gate controlled commutating rectifiers. (Reference is made in this application to "gate controlled rectifiers". Such devices are for the purposes of this application understood to include gate actuated regenerative switches which are extinguished by the application of reverse bias across their electrodes.) By way of example, direct current power is inverted to single phase alternating current power by means of a pair of controlled load rectifiers and a commutating circuit including a respective pair of controlled commutating rectifiers, a pair of feedback diode ractifiers, a commutating capacitor, and a commutating inductor. In a multi-phase inverter system, similar circuity is provided for each phase. To commutate a first load rectifier "OFF," the respective first commutating rectifier is turned "ON" to connect a series oscillatory circuit including the associated capacitor and the associated inductor across the load rectifier. A current pulse produced by the discharging series oscillatory circuit takes over the function of supplying the load current, excess commutation current being conducted around the first load rectifier by a feedback diode. While the commutation current exceeds the load current, the first load rectifier is reversely biased and is turned "OFF" if the reverse bias lasts for a period greater than the turnoff time of the rectifier. After the commutating capacitor has been charged to an opposite polarity, the first commutating rectifier is reversely biased and therefore ceases to conduct. If this condition is maintained for the turnoff time of the first commutating rectifier. it will not conduct when the second commutating rectifier is turned "ON" to commutate the second load rectifier. If, however, the second commutating rectifier is turned "ON" too soon, the forward bias thereby established across the first commutating rectifier will cease it to start conducting again along with the second commutating rectifier. The result of such simultaneous conduction by both commutating rectifiers is effectively a short circuit, known as a "commutating rectifier shoot-through," across the dc source. A shoot-through can result in current levels far greater than those existing during normal operation of the inverter circuit. It is therefore highly desirable that commutating rectifier shoot-throughs be avoided.

Inverters of the type taught by the aforesaid McMurray patent are sometimes referred to as "auxiliary impulse-commutated inverters" because they utilize auxiliary controlled rectifiers (the commutating rectifiers) and an impulse forming circuit (the oscillatory capacitor-inductor commutating circuit) to turn off the respective load current carrying controlled rectifiers. In such an inverter voltage control can be advantageously provided by rapid time-ratio-controlled switching or "chopping superimposed upon the fundamental output frequency of the inverter. This time-ratio-controlled switching produces a series of electric pulses having a duration, or "width," determined primarily by the rate of which successive commutations occur. Since, as discussed above, a commutating rectifier should not be turned on until the commutating rectifier in series with it has had sufficient time to turnoff fully, it will be seen that the characteristics of the circuit components, especially the turnoff time of the commutating rectifiers, limit the maximum rate at which any two successive commutations can occur. Stated differently, the characteristics of the circuit components limit the minimum width of the electric pulses produced by each phase of the inverter.

It has heretofore been proposed that timing means be provided for sensing the firing or tuning on of one of the commutating rectifiers and thereafter preventing the firing of the other commutating rectifier for a fixed time interval sufficient for the first rectifier to turnoff fully. To be effective throughout the entire range of inverter operation, it is essential that the timing means provide a fixed delay interval sufficient to assure full turnoff under any operating conditions which might be encountered. Stated differently, the timing means must operate such that the full-turnoff is accomplished following the longest conceivable commutation interval. Since commutation under no load or light load conditions typically takes substantially longer than commutation under maximum load conditions, it has been desirable heretofore to provide a minimum safe timing interval related to the longest predictable commutation time. In addition, since the actual time interval measured by the timing means may vary substantially from the intended interval, the possibility of such a deviation must be taken into account when designing the equipment. As a result of these factors, the fixed delay interval during which commutation of the other commutating rectifiers is prevented is typically much longer than necessary under most operating conditions.

Despite the fact that commutation time is dependent on the load conditions, if it can be determined when a conducting commutating rectifier is turned off, then the firing of the opposite commutating rectifier can accordingly be controlled so as to minimize the width of the output pulses. To this end various schemes have been devised to sense the current flow in the commutating capacitor branch of the inverter (commonly called the commutating current), and allow for the firing of a commuutating rectifier after a fixed time interval following the detection of a predetermined commutating circuit level. One such scheme is shown and described in U.S. Pat. No. 3,718,853 entitled "Pulse Width Limiting Means for Inverter Circuits", issued to C.C. Graf on Feb. 27, 1973 and assigned to the assignee of the present invention. Although the approach is successful in reducing the commutation period and is acceptable for most applications, it is not entirely satisfactory in terms of its sensitivity and reliability for all applications. In particular, the sensing of a cessation of commutating current flow, which is indicative of a commutating rectifier having been turned off, is difficult to determine with a high degree of precision. Further, the detection of a negative condition (i.e. the dissappearance of a current flow) as a basis on which to allow to follow-up firing of the opposite commutating rectifier, is generally not as precise and reliable as the detetion of a positive condition. In the system, for example, the negative condition (no commutating current flow) exists for the preponderance of the operating cycle, thereby providing no blocking signal for that period of time. Whereas, the period in which commutating current flows, and during which a blocking signal exists, is relatively short. Consequently, the margin of error for detecting the precise time in which the commutating rectifiers are fired, tends to be greater.

Another design feature known in the prior art is that of adding a polarized damping arrangement to the basic inverter circuit to suppress pump-up the capacitor voltage by discharging it to the dc voltage after every commutation. This is accomplished by connecting across each of the commutating rectifiers, a diode and a resistance (commonly called reset resistors) so that half of the excess energy stored in the capacitor is returned to the dc supply and half is dissipated in the resistors to thereby reset the circuit for another commutation.

It has been found for inverter circuits in general that the commutation time increases considerably for large negative load currents (redundant commutation), thereby restricting the voltage control range of pulse width modulated (PWM) inverters. Particularly in polyphase inverter circuits it is possible for commutations to overlap and if this occurs one or more of the phases may be forced into an undesirable type of commutation such as a double-pulse type wherein a long second make-up pulse occurs and the capacitor is again charged up. In such a case it is possible to obtain a false indication of commutation status and thereby allow the firing of a commutation rectifier at the wrong time.

It is therefore an object of this invention to provide a minimum lock-out time for commutating rectifiers of an inverter system.

Another object of this invention is the provision of means for detecting the time at which a commutating rectifier is turned off.

Yet another object of this invention is the provision of a commutating rectifier lock-out control system which is extremely sensitive to changes in commutating current flow near the point where it changes direction.

A further object of this invention is the provision of a commutation rectifier lock-out control in which the turned off condition of a commutation rectifier is indicated by a sensed positive system condition.

Another object of this invention is the provision of a pulse width limiting circuit which is economical to fabricate and extremely function in use.

These objects and other fetures and advantages will become more readily apparent upon reference to the following description when taken in conjunction with the appended drawings.

SUMMARY OF THE INVENTION

Briefly in accordance with one aspect of the invention, a McMurray type auxiliary impulse-commutated inverter is modified by connecting in parallel with each of its auxiliary commutating rectifiers an inversely poled diode and a reset resistor which provide a path for current to flow ehen the voltage on the commutating capacitor tends to rise above that on the d-c terminals of the inverter. This current flow is sensed to obtain an indication that the parallel commutating rectifier is back biased by overcharge current from the commutating capacitor. A fixed time delay commensurate with the turnoff time of the commutation rectifier is then provided before the opposite series connected commutating rectifier is allowed to be turned on by the control system. In this way the sudden appearance of a substantial current flow in the reset resistor provides a positive and relatively precise indication that the commutating rectifier has reverse voltage and should thus be turned off. This positive conditiion only exists during the period in which the overcharge current is discharging with the negative condition existing the remaining preponderance of the operating cycle.

In another aspect of the invention a delay of a fixed time interval subsequent to firing one of the commutating controlled rectifiers is introduced during which time the sensing of a reset current willnot enable the control system to fire the other commutating rectifier. The subject commutation system is then effectively held inactive or locked out until after a point in time at which a double pulse commutation situation may have given a false indication of the sensing means. It is this interval which determines the minimum width of the output voltage pulse.

By a further aspect of the invention another fixed time delay interval is provided to set the maximum duration of the lock-out period. If the lock-out is not removed earlier by the reset-current-sensitive portion of the circuit, it is automatically terminated upon the expiration of this maximum interval.

In the drawings as hereinafter described, a preferred embodiment is depicted; however various other modifications and alternate constructions can be made thereto without departing from the true spirit and scope of the invention.

DESCRIPTION OF THE PREFERRED EMBODIMENT

Figure 1:
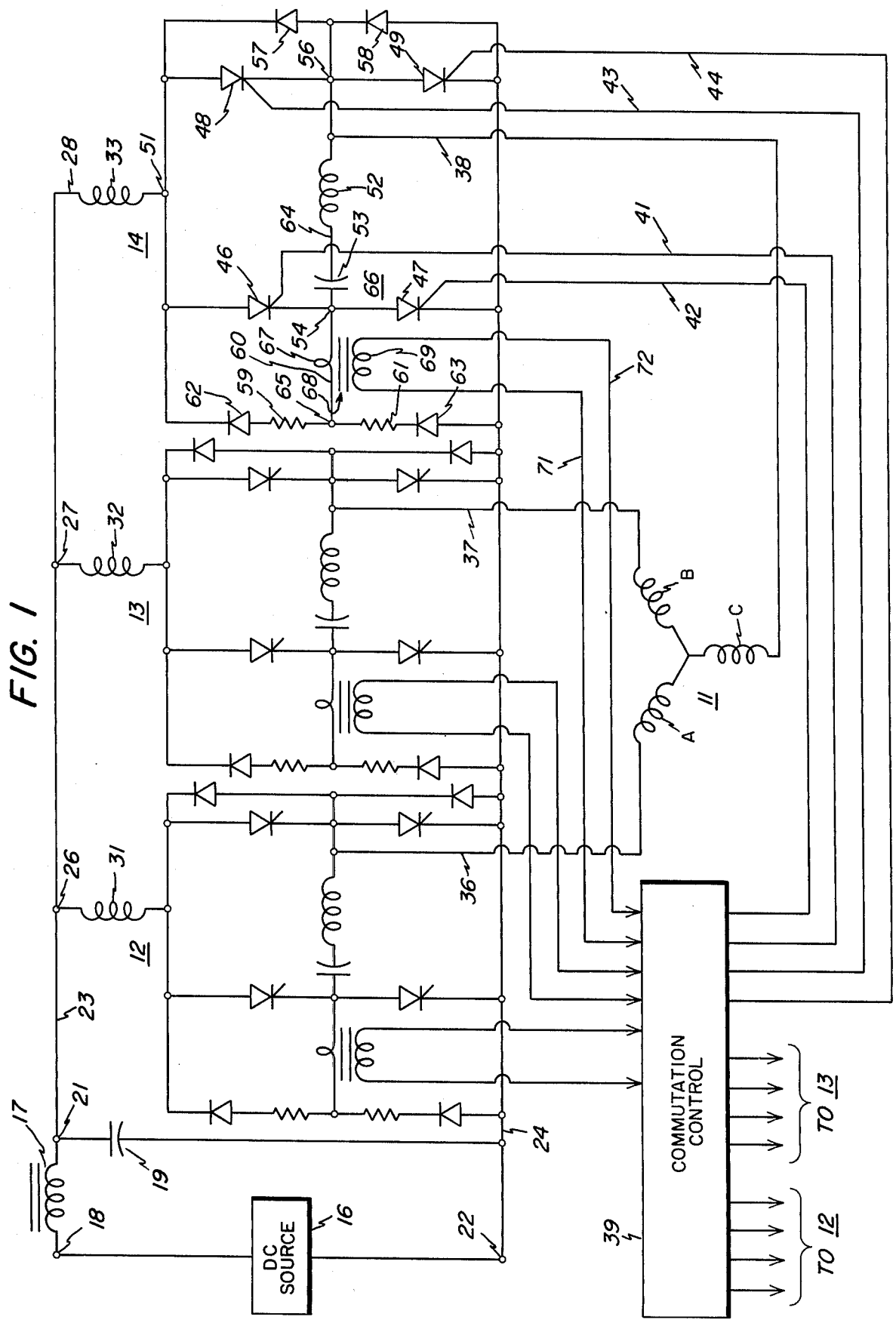
FIG. 1 is a schematic circuit diagram of the preferred embodiment of the invention.

Referring now to FIG. 1 a three phase adjustable speed drive system of the type disclosed by the aforesaid McMurray patent is illustrated and includes a three phase induction motor 11 having phases A, B and C supplied with alternating current electric power from power conversion apparatus comprising single phase full wave inverter circuits 12, 13 and 14. Each of the inverter phase circuits 12, 13 and 14 inverts direct current electric power from a dc source 16 to the alternating current power supplied to the motor 11. Any convenient source of d-c electrical power may be used such as, for example, a rectifying device for converting ac input power to unidirectional output power. Typically in transit drive application the dc power is transmitted to the vehicle by way of a third rail or catenary connection (not shown). To attenuate ripple and provide a low impedance dc source a filter is provided comprising an inductor 17 connected to the posiive terminal 18 of the dc source 16 and a capacitor 19 connected to the inductor 17 at junction 21 and to the negative terminal 22 of the dc source 16. It will occur to those skilled in the art that the power conversion apparatus could alternately be utilized to convert alternating input electrical power to alternating output electrical power of a different frequency as in a cycloconverter.

The power conversion apparatus, preferably a sine-wave shaped pulse-width modulated voltage inverter, is connected to junction 21 through a positive bus 23 and to the dc negative terminal 22 by a negative bus 24 with the phase circuits 12, 13 and 14 connected in parallel across the busses 23 and 24 by the respective positive bus leads 26, 27 and 28 having individual inductors 31, 32 and 33, respectively. The individual phases of the induction motor 11 are connected to their respective phase circuits 12, 13 and 14 by leads 36, 37 and 38 in such a manner as to allow for the alternate switching of each phase between the positive and negative busses 23 and 24 as will be more fully explained hereinafter. Control of the circuits 12, 13 and 14 is maintained by a commutation control circuit 39 as described hereinafter.

All of the power conversion phase circuits 12, 13 and 14 are essentially identical in structure and operation and will now be described in more detail with reference being given to the circuit 14 for purposes of illustration. A clear understanding of the basic operational principles of the inverter may be obtained from the McMurray patent referenced hereinbefore.

The phase circuit 14 comprises two sets of two series connected semiconductor type gate controlled rectifiers 46, 47, 48 and 49 connected between the inlet terminal 51 and the negative bus 24. The gate controlled rectifiers are essentially PNPN semiconductor devices wherein conduction through the device is initiated by the application of a small gating current from the commutation control circuit 39 on lines 41 through 44, respectively, to a gating electrode comprising a part of the device. A commutating circuit comprising an inductor 52 and a capacitor 53 connected in series circuit relationship, is connected between the juncture 56 of the two load current carrying gate controlled rectifiers 48 and 49 and the juncture 54 of the two commutating gate controlled rectifiers 46 and 47. A pair of commutating diodes 57 and 58 are connected across respective ones of the gate controlled rectifers 48 and 49 in a reverse polarity sense for returning to the dc supply 16 the reactive power associated with inductive or capacitive loads or regeneration of power from the motors during braking. When an inverter is supplying an inductive load and the load current rectifier has been suddenly turned off by the commutating impulse, the conducting polarity of the complementary controlled rectifier is not appropriate but the feedback rectifier 57 or 58 connected (directly or effectively) in inverse parallel with such complementary controlled rectifier will provide the necessary conducting path. A similar feedback rectifier across the other controlled rectifier functions during the other half cycle. Connected across the respective gate controlled rectifiers 46 and 47 in a reverse polarity sense are the commutation reset resistors 59 and 61 and diodes 62 and 63. Devices 63, 61, 59, and 62 are connected, in the order recied from line 24 to juncion 51. The serially connected diodes are thus essentially connected in parallel with rectifiers 46 and 47 and are inversely poled in respect thereto. As subsequently described, a transformer primary winding 67 is connected in line 60 between junction 54 and the junction 65, of resistors 59 and 61. The reset resistors 59 and 61 may be combined in a single resistance placed in line 60 connecting juncture 54 and the juncture 65. The purpose of these resistors and diodes is to discharge the over-voltage that appears on the commutation capacitor 53 when commutating load current as will be explained hereinafter. The juncture 56 is connected by line 38 to the phase C winding of the induction motor 11 such that as the juncture 56 is switched between the positive and negative busses 23 and 24, by the alternate firing of load current carrying rectifiers 48 and 49, the voltage at juncture 56, and thus in phase C of the motor, varies accordingly. By properly timing the firing signals from the commutation control circuit 39 to trigger the rectifiers 48 and 49, the voltage waveform desired to be impressed on phase C can be obtained. Similarly the firing of the commutating rectifiers 46 and 47 is also controlled in the proper sequence and schedule by the commutation control circuit 39.

In operation gating signals are supplied from commutation control circuit 39 by lines 43 and 44 to the gating electrodes of each of the gate controlled rectifiers 48 and 49 respectively, of phase circuit 14. When controlled rectifier 48 is gated on the potential appearing at juncture 56 is that at the positive input terminal 51 and represents, in essence, the output load voltage being supplied by that phase of the inverter. During the interval of time that the gate controlled rectifier 48 is on, the potential at the juncture 56, and at a point 64 between the inductor 52 and capacitor 53, will be essentially the potential of the positive input terminal 51, while the juncture 54 will be maintained at some negative potential value equal to or lower than the negative potential of the power supply. Hence the capacitor 53 will be charged to a potential corresponding to the difference between juncture 54 and point 64. Thereafter, when the gate controlled rectifier 46 is rendered conductive, the potential of juncture 54 will jump to the positive voltage at input terminal 51 and the potential of the point 64 will jump above that of the positive terminal 51 by the amount of the potential across the capacitor 53. Upon this occurrence the capacitor 53 will be discharged by a current through the inductor 52 and through the commutating diode 57 and the gate controlled rectifier 46, and will maintain a reverse polarity across the gate controlled rectifier 48 thereby causing this gate controlled rectifier to be turned off. In discharging through the inductor 52, a magnetic field will be built up around the inductor which upon collapsing will cause a reverse polarity charge to be built up across the capacitor 53 so that the point 64 becomes negative with respect to the juncture 54. Thereafter, the load current carrying gate controlled rectifier 49 may be rendered conductive which results in connecting juncture 56 to the negative bus 24 thereby immediately driving the potential of juncture 56 from the full positive potential of terminal 51 down to the full negative potential at the bus 24. At this time the capacitor 53 will be further charged toward the negative value of bus 24.

Due to the flywheel effect of the inductor 52 and inductor 33, the capacitor 53 will be charged to a potential somewhat greater than the full potential between bus lines 23 and 24. At this time the potential of point 54 becomes positive in respect to the terminal 51, thereby impressing a reverse voltage across gate controlled rectifier 46 to turn it off. When that occurs the reset diode 62 begins to conduct current back to the input terminal 51 through the reset resistor 59. In this way the overcharge current from the capacitor 53 is discharged to reset the circuit for the next commutation, with half of the excess energy being returned to the dc supply and the other half being dissipated in the reset resistor 59. It can therefore be understood that the appearance of current flow in the resistor 59 is an indication that a reverse voltage condition exists across rectifier 46 and after a short time period equal to the turnoff time of the rectifier 46, it will in fact be turned off. As mentioned hereinbefore this determination is significant in that only now can the other commutating rectifier 47 be fired to commutate the opposite load current carrying rectifier 49.

The detection of current flow in the reset resistor 59 is accomplished with a current transformer 66 connected in the circuit between junctures 54 and 65. The current transformer is of a well-known type having a primary coil 67 serially connected in line 60, a core 68, and a secondnary coil 69 whose leads 71 and 72 are connected to the commutation control circuit 39. Upon the first appearance of current flow in line 60, a signal is received by the commutation control circuit 39 whose function is to delay the firing signal applied to commutating rectifier 47 for a fixed time period. This assures adequate commutation time for shut-off of commutating rectifier 46.

Similarly commutating rectifier 47 is fired to turnoff load rectifier 49. When commutating rectifier 47 is subsequently reverse biased, juncture 54 becomes negative in respect to line 24 and reset diode 63 conducts current from line 24 to capacitor 53 through reset resistor 61. Thus overcharge current from capacitor 53 is similarly discharged to reset the circuit for the next commutation. This current flow is similarly detected by the current transformer 66.

Phase circuits 12 and 13 are identical to the phase circuit 14, and the firing of the rectifiers contained therein is similarly controlled by the commutation control circuitry 39. A condition that may occur is that of having a simultaneous commutation in any two phases of the inverter, thereby causing mutual interference through the common inductance in the dc busses. It is then possible to get an undesirable double commutating pulse in one of the phases as will be more fully described hereinafter.

Figure 2A:
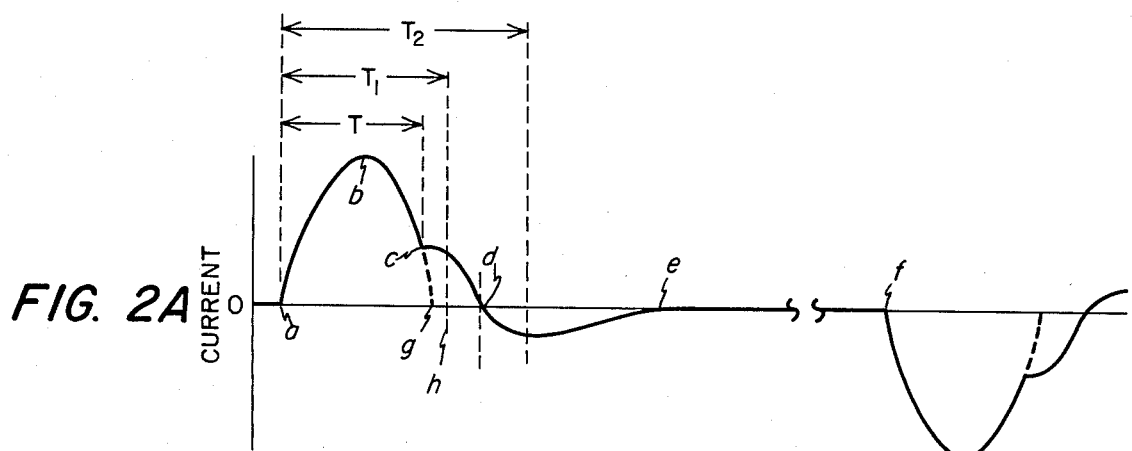
FIGS. 2A–2G are graphic illustrations of typical current waveforms associated with the inverter commutation cycle.

Referring now to FIG. 2A and B the waveforms are shown for both commutating current and the reset current for a full commutation cycle under normal conditions. Looking first at the commutation current waveform of FIG. 2A let it be assumed that the load current carrying rectifier 48 is conducting and that the capacitor 53 is charged with no current flowing therein. At point $a$ the commutating rectifier 46 is fired and the capacitor 53 begins to discharge through the inductor 52. The current flow rapidly increases sinusoidally to a peak $b$ at which point the capacitor is fully discharged, and thereafter, due to the oscillatory nature of the commutating circuit, the commutating current will recharge the capacitor with opposite polarity. The charging current then decreases in a symetrical manner to point $c$ at which time the main current carrying rectifier 49 is turned on and provided an additional path for current flow. The capacitor 53 continues to charge until, at point $d$, the commutating current decays to zero and the commutating rectifier 46 can no longer conduct. At this time a reverse voltage, i.e. a back bias voltage is applied to rectifier 46, which initiates turnoff of this device. Concurrently therewith the overcharge current on the capacitor 46 begins to flow in the opposite direction through reset resistor 59 and diode 62 and finally recedes to zero at point $e$. Thus overcharge current provides a positive indication that a reverse voltage, i.e. back bias voltage is applied to commutating rectifier 46. The commutating current then remains at the zero level until the start of the next cycle at point $f$.

Figure 2B:
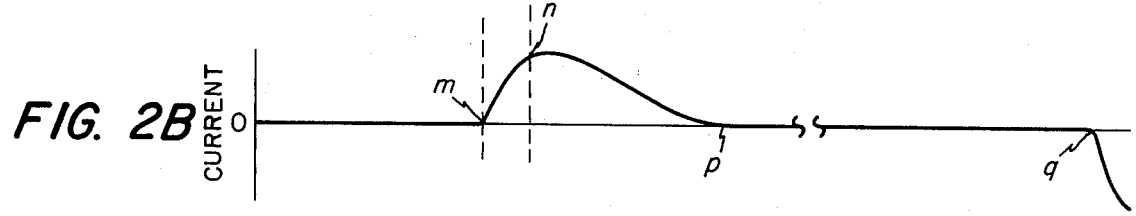

Referring now to the reset current waveform in FIG. 2B, there exists no reset current flow in the cycle of operation during the time (from point $a$ to point $d$) in which the commutating current is flowing. At point $m$, which corresponds in time to point $d$ of FIG. 2A, the reverse voltage has been impressed across gate controlled rectifier 46 to turn if off and at that point the reset current begins to flow. The flow rate increases to point $n$ and then gradually decreases to zero at is approaches point $p$. It remains at zero until the start of the next cycle at point $q$.

Figure 3:
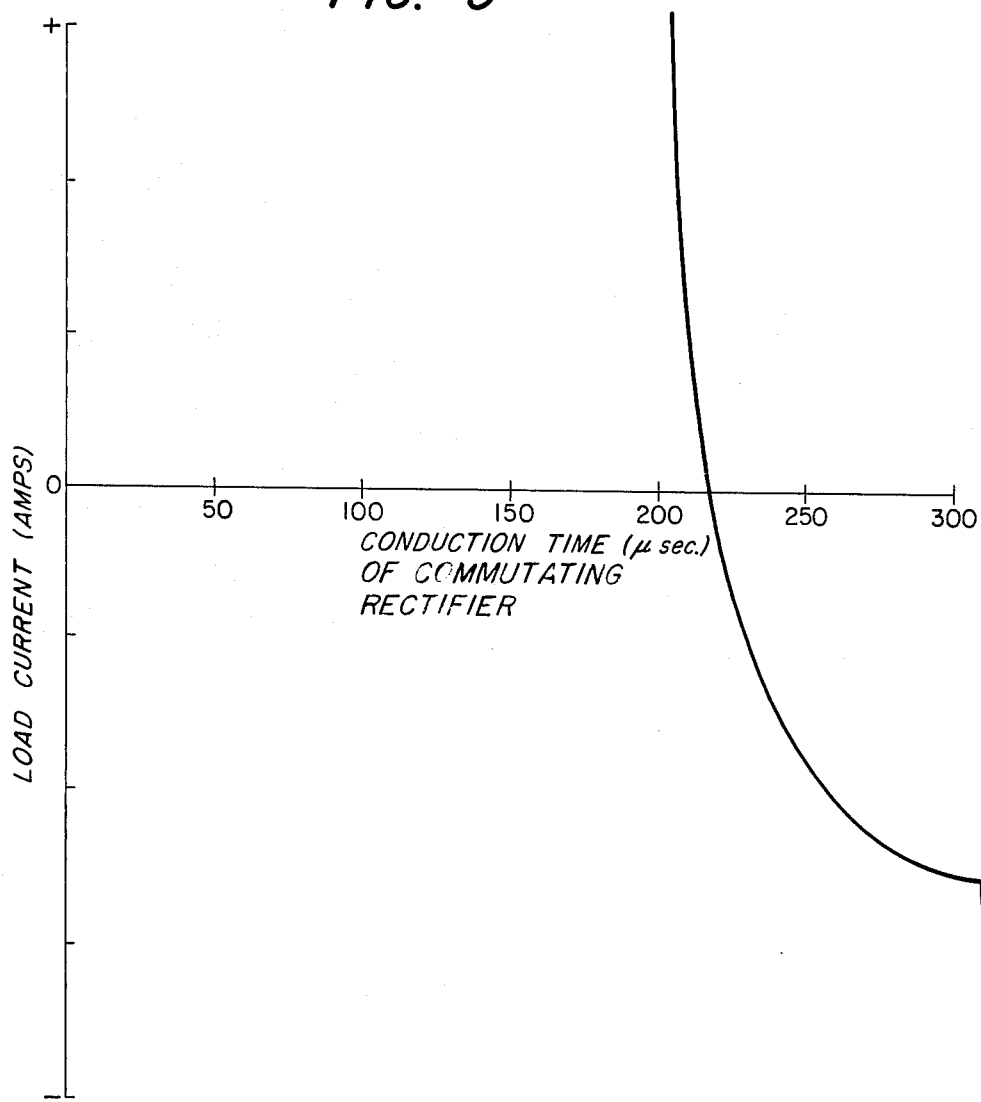
FIG. 3 is a graphic illustration of conduction time versus load current for a commutating rectifier.

The phenomena mentioned hereinbefore, that if the rectifier conduction time varying with the load current, is illustrated in FIG. 3. It is apparent that for negative load currents the conduction time is appreciably greater than that for positive load current. Since the more likely operating condition is with a positive load current, the use of a short time interval during that operation time is highly desirable. However, where longer time intervals are required, as in negative load current conditions, it is imperative that provision be made in the system to accommodate such operating conditions. The present system is designed to provide at any instant the shortest possible time interval when operating over a wide range of load current conditions. It should be pointed out that when the load current is negative as occurs in a braking mode of operation, power is fed back through the feedback diode at the start of commutation, and the process of extinguishing the load current carrying rectifier is redundant, since it is already non-conducting. However, the reversal of capacitor charge is necessary for subsequent forced commutation of the opposite rectifier.

Figure 4:
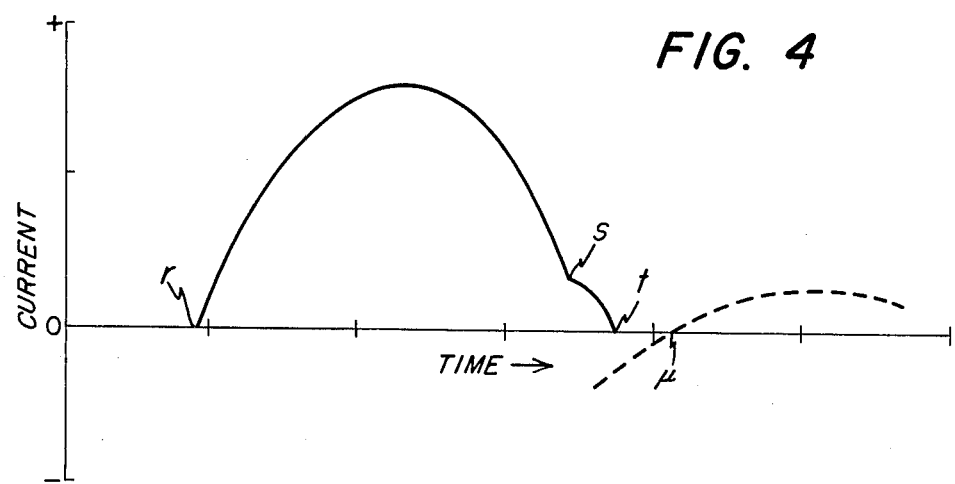
FIG. 4 is a graphic illustration of a commutating current waveform wherein a double pulse occurs.

The double pulse phenomena is illustrated by the commutation current waveform of FIG. 4. This may occur if the delay in firing the load current carrying rectifier 49 is relatively long and the load current is flowing through the diode rather than the current carrying rectifier or two phases commutate nearly simultaneously. If the commutating rectifier 46 is fired at $r$ and the rectifier 49 is fires at $s$ the capacitor current becomes zero at $t$ and the commutating rectifier 46 is reverse biased before the transfer of load current from the feedback diode 57 to the rectifier 49 is complete. If now, the capacitor voltage is less than the dc voltage, the rectifier 46 again becomes forward biased and will refire provided that it sill has gate drive. A second small pulse of capacitor current will then flow as indicated by dashed lines in FIG. 4, to charge the capacitor 53 above the level of the dc bus. If the commutating rectifier 47 is now fired before the commutation current returns to zero and biases rectifier 46 off then a shoot-through will occur. It is therefore important that the commutation control circuit 39 does not receive a false signal at point $t$, which tells it to go ahead and fire rectifier 47. Accordingly provision is made to prevent firing of this commutating rectifier (47) for a fixed timing interval $T_1$ subsequent to firing of the preceding commutating rectifier. FIG. 2A illustrates the sinusoidal commutating current which increases to a mxaimum at time *b* and subsequently declines. The dashed line in FIG. 2A illustrates the decline of commutating current which would occur without firing load current carrying rectifier 49. Without such firing the commutating current would decline to zero at time *g*. This time interval therefore represents the minimum time duration of the commutating current. In an embodiment of the invention time interval $T_1$ was chosen to terminate at a time *h*, which occurs a short time interval, e.g. 20 micro seconds, after time *g*.

Figure 5:
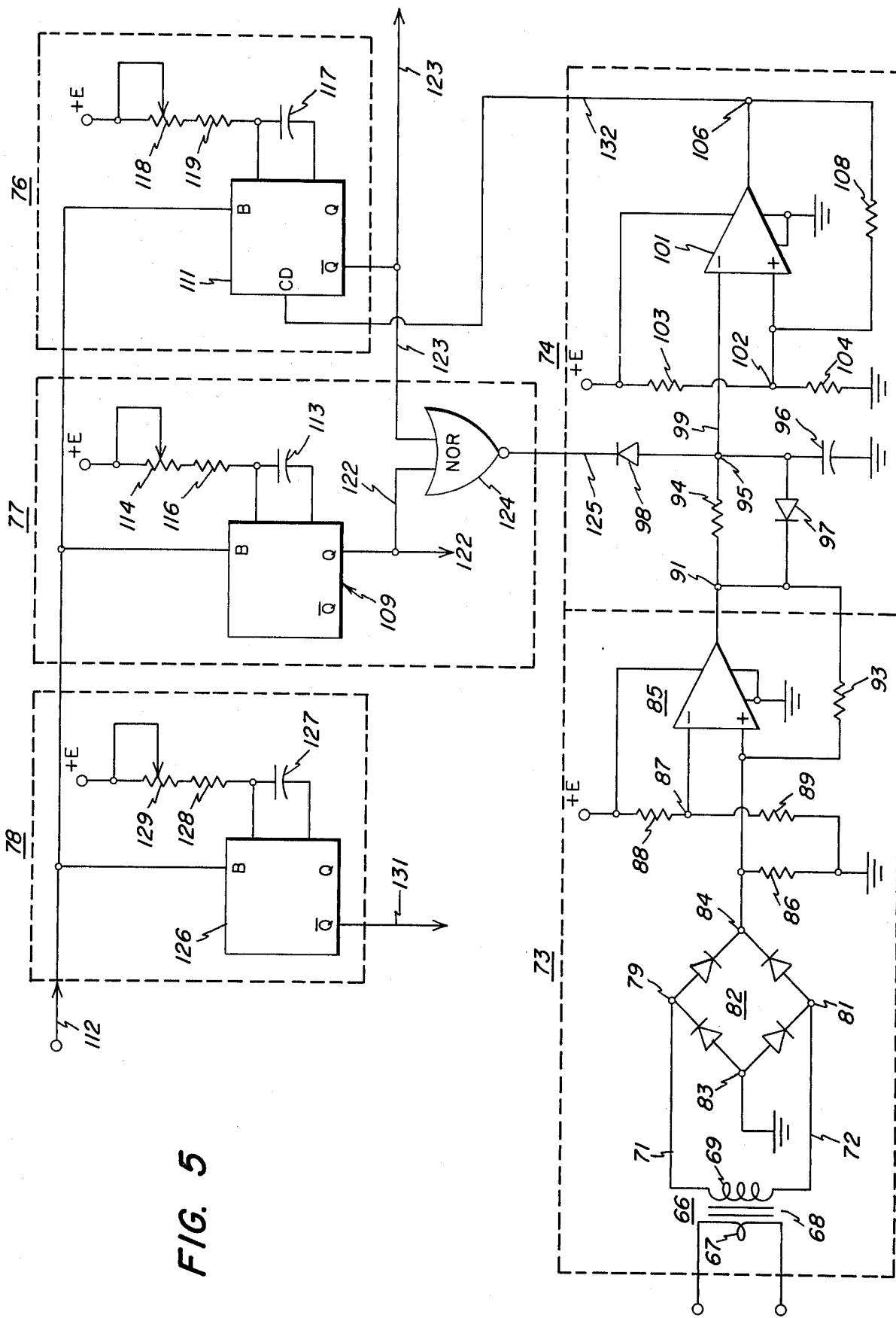
FIG. 5 is a schematic circuity diagram of the sensing and lock-out portion of the preferred embodiment of the invention.
Figure 6:
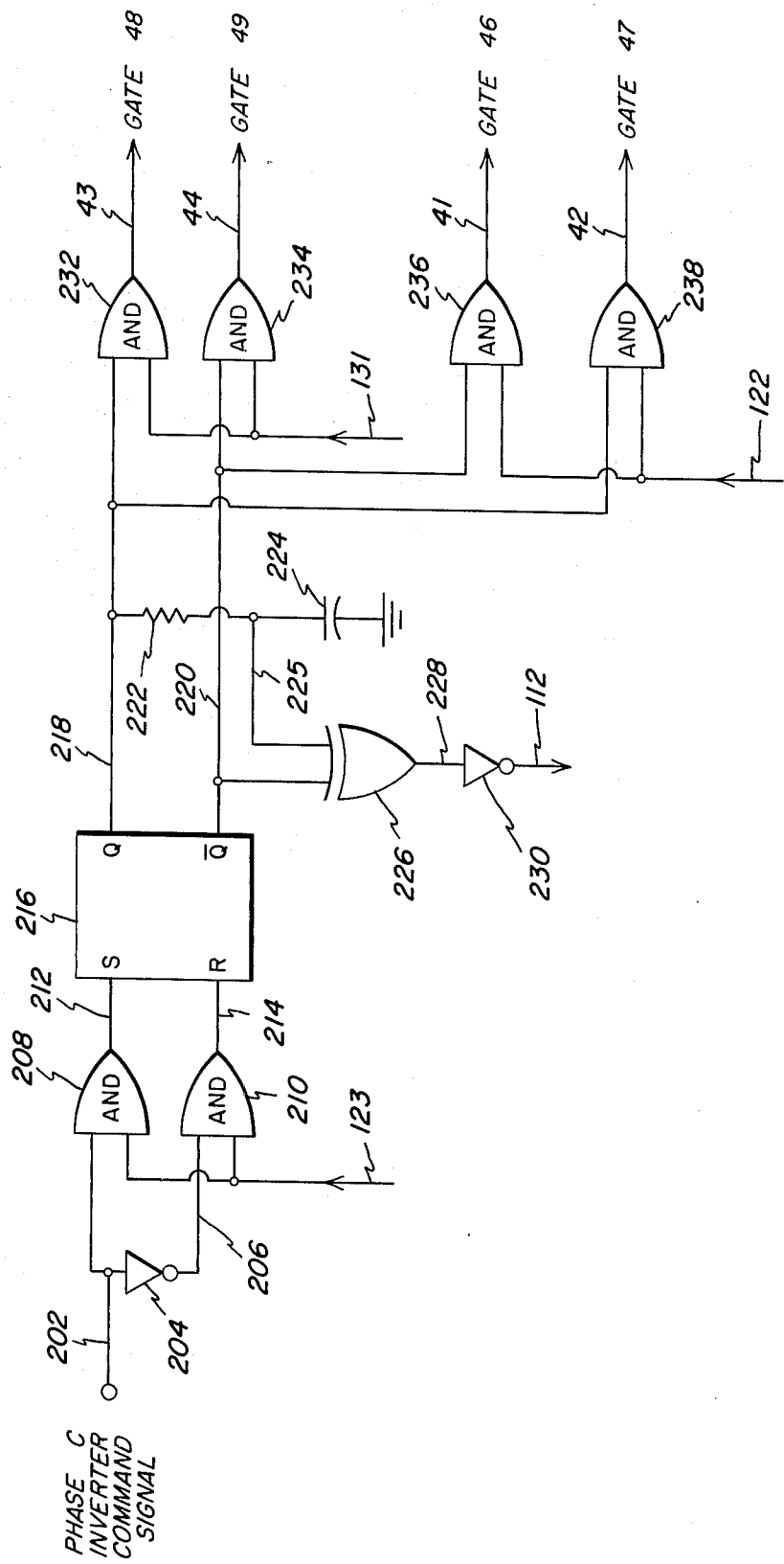
FIG. 6 is a simplified schematic of the firing control circuits of the preferred embodiment.

The commutation control circuit 39 comprises circuitry for firing the load carrying and commutating rectifiers, substantially identical circuitry is provided for each of phase circuits 12, 13 and 14, only the circuitry for phase circuit 14 is subsequently described. FIG. 5 illustrates a circuit portion which receives pulses on line 112 substantially coincident with the firing of a commutating rectifier and produces a lock-out signal on line 123 which inhibits firing of the subsequent commutating rectifier for the appropriate time interval. In addition the circuit of FIG. 5 also generates a signal on line 122 for gating the commutating rectifier at time *a*, i.e. upon occurrence of a pulse on line 112, and generates a signal on line 131 for preventing gating of both load current carrying rectifiers during the commutation interval and then gating a load current carrying rectifier at time *c*, i.e. at a time interval T after the commutating rectifier is fired. FIG. 6 illustrates in simplified form a circuit portion which, responsive to applied inverter command signals and the above referenced signals generated by the circuit of FIG. 5, produces signals for firing the load current carrying rectifiers and the commutating rectifiers, and additionally generates the timing pulse signals supplied on line 112 to the circuit of FIG. 5.

Referring now to FIG. 5 the control apparatus shown is that associated with the inverter phase circuit 14, there being identical apparatus provided for each of the phase circuits 12 and 13 all of which are included in the commutation control circuitry 39 of FIG. 1. Briefly, the apparatus includes sensing circuitry 73 for sensing the current flow in the reset resistor, enabling circuit 74 which controls the duration of the lockout pulse, inhibit circuits 76 and 77 which establish the minimum and maximum time limits of the lock-out pulse, and a timing circuit 78 for regulating the firing of load current carrying rectifiers.

The sensing circuitry 73 includes the current transformer 66 also shown in FIG. 1, whose secondary coil 69 is connected by leads 71 and 72 to terminals 79 and 81 of a full wave rectifying diode bridge 82. The other terminals 83 and 84 of the bridge 82 are connected respectively to ground and to the input of an operational amplifier 85 which acts as a comparator as will be further explained. A loading resistor 86 is connected between termininal 84 and ground to provide a suitable voltage signal proportional to the reset current, and thereby acts to set the circuit sensitivity. A second input to the operational amplifier 85 is from a junction 87 which exists between the two resistors 88 and 89 forming a voltage divider network which is placed between a plus 15 V potential and ground. The input from the voltage divider serves to bias the operational amplifier 85 such that when the value of the signal applied to its terminal exceeds that applied from junction 87, there is a positive output, and when the value of the signal at junction 87 exceeds the input, the output is negative. The output is biased between plus 15 volts and ground such that the output of junction 91 either goes to plus 15 volts or to ground. A resistor 93 is connected between junction 91 and the input to provide hysteresis. The portion of the sensing circuit discussed above thus detects overflow current coupled through transformer 66 and switches the output at junction 91 of operational amplifier 85 from a low level to a high level when the amplitude of the overflow current exceeds a predetermined reference level as established at junction 87. Junction 91 is connected through a resistor 94 to junction 95 which in turn is connected to ground through a capacitor 96. Resistor 94 and capacitance 96 constitute an R-C timing network and its parameters are selected to have a delay time equal to the turnoff time of a commutating rectifier. As explained subsequently the rise of voltage at junction 95 is thus delayed in respect to the rise at junction 91 by a time interval equal to the turnoff time. A diode 97 is connected between capacitor 96 and junction 91 to provide a fast reset of timing function when the reset current disappears so as to discriminate against noise inputs.

Junction 95 is also connected through diode 98 and line 125 to the output of NOR gate 124, of the inhibit circuits. As explained subsequently the output of the NOR gate is switched between a low level and a high level. The diode 98 is poled to conduct whenever the voltage at junction 95 is above the low level during time intervals when the NOR circuit output is at a low level. Thus the inhibit circuits, by control of the output state of NOR circuit, can selectively clamp, junction 95, e. g. prevent a rise of voltage at junction 95. As described subsequently, an appropriate rise in voltage level at junction 95 is indicative of the termination of the lock-out period.

Enabling circuit 74 is utilized to terminate the lock-out pulse upon occurrence of a voltage rise at junction 95. Lead 99 connects junction 95 to an inverting input of operational amplifier 101. Resistors 103 and 104 are serially connected between a positive potential, e.g. plus 15 volts, and ground, and their junction 102 is connected to the other input of the operational amplifier, so as to apply thereto a threshhold reference voltage. A resistor 108 is connected between junction 102 and amplifier output terminal 106 so as to provide hysteresis. During quiescent conditions, when the voltage at junction 95 is below the level of the threshhold voltage, the amplifier has a high level output, e.g. plus 15 volts, at terminal 106. However, when the voltage level at junction 95 increases so as to exceed the threshhold voltage, the output at terminal 106 is switched to a low level. This change of state is indicative of the end of the lock-out time interval. Line 132, connected between junction 106 and terminal CD of multivibrator 111 in inhibit circuit 76, is utilized to terminate the lock-out pulse.

Reference is now made to circuits 76 through 78 each of which comprise a monostable multivibrator 111, 109, and 126, respectively, all of which are simultaneously turned on by the pulse signal applied by line 112 to their respective B terminals. Each of the multivibrators produces a square wave output whose time duration can be established by an associated R-C network. Thus each multivibrator has a capacitor connected across two of its terminals. One end of the capacitor is serially connected through a resistor and a potentiometer to a source of positive potential, e.g. plus 15 volts. The R-C network of multivibrator 111 comprises capacitor 117, resistor 119, and potentiometer 118. The network of multivibrator 109 comprises capacitor 113, resistor 116, and potentiometer 114, and that of multivibrator 126 comprises capacitor 127, resistor 128 and potentiometer 129. The resistance and capacitance parameters of each network are chosen to provide an appropriate pulse duration, i.e. pulse width, and the multivibrators operate in the manner described in Pulse, Digital and Switching Waveforms, Millman and Taub, McGraw Hill Inc. 1965.

Figure 2C:
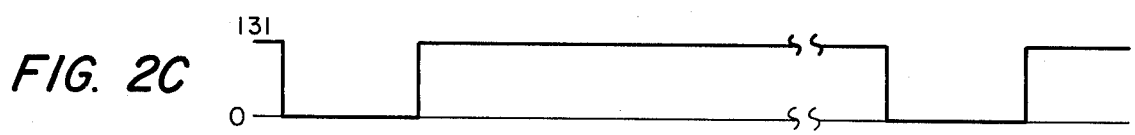

Circuit 78 produces an output signal at $\overline{Q}$ terminal of multivibrator 126 which is coupled by line 131 to a firing circuit for the current carrying controlled rectifiers of one phase circuit of the inverter. During quiescent conditions the output on the $\overline{Q}$ terminal and on line 131 has a high level, e.g. plus 15 volts. Upon occurrence of a pulse on line 112, the signal on line 131 is switched to a low level, e.g. ground potential, for a time interval T established by the parameters of the R-C network connected to multivibrator 126. At the termination of time T the signal reverts to the high level, as shown in FIG. 2C. As subsequently described in connection with FIG. 6, line 131 is connected to gate the current carrying controlled rectifier, e.g. 49, at time T subsequent to the firing of one commutating rectifier, e.g. 46.

Figure 2D:

Inhibit circuits 76 and 77 operate in conjunction with circuits 73 and 74 to supply a lock-out pule of proper duration on line 123. Multivibrator 109 of circuit 77 produces at its output terminal Q a quiescent low level signal which is switched to the high level for a time interval $T_1$, established by the R-C network of multivibrator 109, and then reverts to the low level. Line 122 couples this signal, shown in FIG. 2D, to one input of NOR gate 124. As subsequently described in connection with FIG 6. line 122 is additionally coupled to the commutating rectifier firing circuit so as to fire the appropriate commutating rectifier, e.g. 46, coincident with the occurrence of the clock pulse on line 112.

Figure 2E:
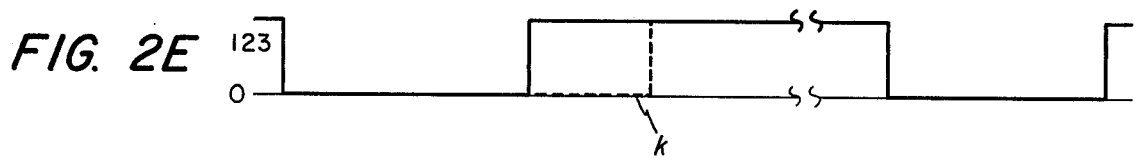
Figure 2F:
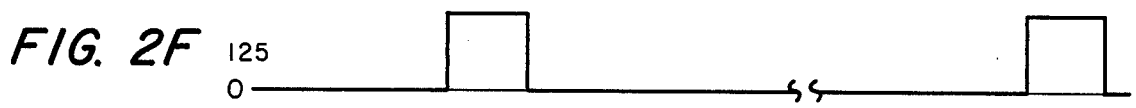
Figure 2G:
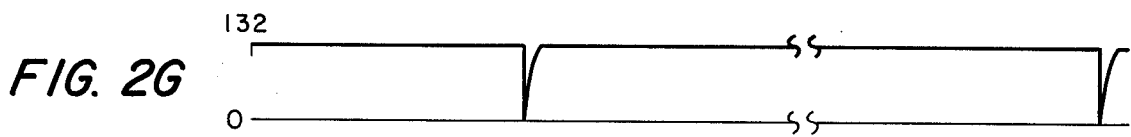

Multivibrator 111 of circuit 76 produces at its output $\overline{Q}$ a quiescent high level signal which is switched to the low level coincident with the occurrence of a pulse on line 112. The R-C network of the multivibrator is chosen so that the mxaimum time duration of this low level signal, at terminal $\overline{Q}$ and attached line 123, is at least equal to the minum safe time interval, required to avoid a commutating rectifier shoot-through under any operating conditions, between the firing of one, e.g. 46, and the other, e.g. 47, commutating rectifier. A wave form having this maximum period is illustrated in FIG. 2E as commencing at time $a$ and extending as far as the dashed line $k$. However, provision is made for earlier termination of the output pulse on terminal $\overline{Q}$, in view of the connection of line 132 to terminal CD of multivibrator 111. The multivibrator requires application of a high level signal at terminal CD during generation of its low-level square wave output. The output square wave is terminated prior to its maximum time duration, upon removal of this high level signal. The signal on line 132 is at a high level until a turnoff signal is produced which switches the signal on line 132 to a low level, as shown in FIG. 2G, whereupon the low-level square wave output of multivibrator 111, i.e. the lock-out pulse on line 123, is simultaneously terminated. This square wave output is illustrated in FIG. 2E by the solid line square wave, and its period of duration is $T_2$.

NOR gate 124 receives input signals from lines 122 and 123 respectively. The NOR gate output is zero, i.e. at a low level, except during time intervals when the input signals on both of lines 122 and 123 are at a low level. Inspection of FIGS. 2D and 2E confirms that this condition can occur only during the time interval commencing upon the termination of the pulse on line 122 expiring upon the termination of the lock-out pulse on line 123. Stated alternately, the output of NOR gate 124 is at a low level as shown in FIG. 2F, except during the time interval after termination of time $T_1$ but prior to termination of time $T_2$. As previously described the potential at junction 95 of circuit 73 can only rise, responsive to overflow current, during the time interval when the NOR gate output is at a high level, i.e. "1 state". Therefore the lock-out pulse continues for its maximum period, unless it is terminated earlier, but after the initial time interval $T_1$, in response to the detection of overflow current. The arrangement thus constitutes an aperture gating circuit which prevents improper termination of the lock-out pulse. The aperture and timing circuits therefore prevent termination of the lock-out period until after the simultaneous occurrence of a reverse bias of the one commutating rectifier for its turnoff time and the removal of its gate pulse. This assures that the one commutating rectifier is completely turned off and can not refire prior to firing of the other commutating rectifier.

Reference is now made to FIG. 6 which is simplified form illustrates that portion of commutation control circuit supplying gating signals to the load carrying and commutating rectifiers of one phase circuit responsive to an inverter command signal, applied from an external source, and to the output signals of the circuit shown in FIG. 5.

An inverter command signal, for the phase circuit, is applied from an external source to input line 202 which is connected to one input of AND gate 208 and through inverter 204 and line 206 to an input of AND gate 210. The command signal is switched between high level and low level states, a high level state commands connection of the load circuit to the positive bus, e.g. gating on current carrying rectifier 48 of FIG. 1, and a low level state commands connection of the load circuit to the negative bus, e.g. gating on current carrying rectifier 49. Line 123 is connected from the inhibit circuits of FIG. 5 to the other inputs of AND gates 208 and 210 to provide lock-out as subsequently described. The outputs of these gates are connected by lines 212 and 214, respectively, to terminals S and R of set -- reset flip flop device 216. Output Q of device 216 is connected by line 218 to one input of AND gate 232, whose output line 43 is connected to the gate of current carrying rectifier 48, as shown in FIG. 1 and to one input of AND gate 238 whose output is connected by line 42 to the gate of commutating rectifier 47. Output $\overline{Q}$ of device 216 is connected by line 220 to one input of AND gate 234, whose output is connected by line 44 to the gate of current carrying rectifier 49, and to one input of AND gate 236, whose output is connected by line 41 to the gate of commutating rectifier 46. The line 218 input to AND gate 232 and the line 220 input to AND gate 234 provide for a slight time delay, such as by a resistance and capacitance (not illustrated), to prevent erroneous firing of the rectifiers 48 and 49 subsequent to change of state in device 216 but prior to generation of a pulse on line 131. Line 131 is connected from the inhibit circuit 78 of FIG. 5 to the other inputs of AND gates 232 and 234. Line 122 is connected from the circuit 77 to the other inputs of AND gates 236 and 238.

The complementry signals on output terminals Q and Q of flip flop reset device establish the firing sequence for the rectifiers. Thus a high level signal output on terminal Q enables firing of rectifiers 48 and 47, and a high level signal on terminal Q enables firing of rectifiers 49 and 46. However, a rectifier can be fired only when there is a high level signal on its firing line. This requires simultaneous application of a high level signals to both inputs of the AND gate whose output is connected to the firing line, i.e. the simultaneous application of high level inputs from device 216 and from the inhibit circuits of FIG. 5.

For purposes of explanation it is assumed that responsive to a low level command signal, commanding the gating on rectifier 49, a high level signal has just been applied to terminal R of device 216. The flip-flop device 216 is therefore switched to a state such that there is a high level signal on line Q and a low level signal on line Q. Low level inputs are applied to AND gates 232 and 238, so that rectifiers 48 and 47 can not be gated. Conversely a high level input is applied to one input of each of AND gates 234 and 236.

As explained subsequently a pulse signal is generated on line 112 briefly after a change of state of the flip-flop output. The pulse causes the commutation rectifier signal on line 122 to simultaneously change from a low to a high level. Since both inputs of AND gate 236 are then at a high level, a high level signal appears on line 41 so as to gate on commutating rectifier 46 for the duration of time $T_1$. The signal on line 131, however, remains low until the expiration of time T thus inhibiting firing signals to the load carrying rectifiers 48 and 49. At such time, the signal on line 131 is switched to a high level and a high level signal is applied on line 44 so as to gate on current carrying rectifier 49. The signal outputs on terminals Q and Q remain unchanged, and rectifier 49 continues to conduct, until the output state of device 216 is again switched by the application of a high level signal to terminal S of the device. Application of such a signal, responsive to a high level command signal, will switch the output at the Q terminal to a high level and the output at the Q terminal to a low level, causing firing of commutating rectifier 47 and after a time interval T of current carrying rectifier 48.

However, the lock-out signal circuit prevents a premature change of state of the device 216 outputs, and thus prevents firing of consecutive commutating rectifiers prior to an appropriate lock-out time. The inverter command signal is applied to one input of each of AND gates 208 and 210 such that the input of AND gate 208 has a high level, and the input of AND gate 210 has a low level, when a high level command signal is applied. Conversely the input of AND gate 210 has a high level, and the input of AND gate 208 has a low level, when a low level command signal is applied.

A change of state of device 216, resulting in generation of a pulse on line 112, and firing of a commutating rectifier, also results in generation of a lock-out pulse on line 123 having a time duration $T_2$. During this time interval $T_2$ line 123 applies a low level signal to the other inputs of AND gates 208 and 210. Accordingly, the outputs of both of these gates is at a low level during the time interval $T_2$. This effectively inhibits any change in the output state of device 216 during such time interval $T_2$ and prevents premature firing of the commutating rectifiers, irrespective of the state of the inverter command signal.

Reference was previously made to the circuit for generating firing pulses on line 112, which includes components 222, 224, 226, and 230. The Q output of device 216 is directly applied to one input of exclusive OR circuit 226 and the Q bar output is applied through the R-C timing circuit comprising resistor 222 said capacitor 224. As a result a pulse is generated on the output of circuit 226 having a duration which is a function of the parameters of the R-C network. These pulses are inverted by inverter 230 prior to application by line 112 to the circuit of FIG. 5.

The pulses on line 112 are generated as follows. The output terminals of device 216 are always complementary, i.e. Q is zero and Q is "1", or Q is "1" and Q is "0". Therefore under quiescent conditions the inputs to the exclusive or circuit have different states, i.e. one is at a high level and the other is at a low level. The output of circuit 226 is therefore normally at a high level and the inverted output on line 112 is at the desired low level. When the states of the Q and Q outputs are switched, by application of the appropriate high level signal to imput terminal S or R, the state of the signal applied, from the Q terminal, to one input of the exclusive or gate is switched simultaneously. However, the signal applied to the other input of circuit 226 on line 225 from the junction of resistor 222 and capacitor 224 changes its state exponentionally at a rate determined by the R-C network. Accordingly for a brief interval, substantially coincident with the change of state at the output of device 216, both inputs to the exclusive or gate have identical states. Accordingly, the output of the exclusive or gate momentarily goes to a low level and the inverted output on line 112 momentarily goes to a high level thus providing the clock gating pulse required to gate on the multivibrators in the circuit of FIG. 5.

The operation of the circuit will now be described assuming first that controlled rectifier 48 is conducting and that capacitor 53 is charged with no current flow in the oscillatory circuit. There is then no current flow detected by the current transformer 66 and the output at junction 106 is high, i.e. plus 15 volts. At a time corresponding to point "a" (FIG. 2A) the commutating rectifier 46 is fired and the capacitor rectifier to discharge as described hereinbefore. At the same time that rectifier 46 is fired a signal is received along the 112 by each of the monostable multivibrators in circuits 76, 77 and 78 to start them timing. The output on line 131 from terminal Q of multivibrator 126 is then switched to low, that on line 122 from terminal Q of multivibrator 109 is switched to high, and that on line 123 from terminal Q of multivibrator 111 is switched to low. With a high signal input, on line 122, and a low signal input, on line 123, applied to NOR gate 124 the output to line 125 is low. Thus if a positive signal exists at junction 95 the diode 98 would conduct and effectively shut off any positive input to the enabling circuit along line 99. After a fixed time period T has passed, the multivibrator 126 in circuit 78 shuts off and the output to line 131 goes high thereby providing a signal for the current carrying rectifier 49 to be fired. When the rectifier 49 is fired (point C in FIG. 2) the commutation curent continues to flow in the same direction and still no current flow is detected by the current transformer 66. After a time period $T_1$ has passed the multivibrator 109 in circuit 77 shuts off and thereby provides a low signal on line 122 to the NOR gate and a high output signal to line 125. The diode 98 is thus shut off and will subsequently allow the junction 95 to rise in voltage in response to detected commutation current. Up until this point the inhibit circuit 77 has prevented the sensing and enabling circuits 73 and 74 from being operative. The purpose of this is to protect the system from responding to noise or to a double pulse condition as described hereinbefore. In other words if that condition does occur as illustrated in FIG. 4, the sensing circuit will begin to operate at point $t$ to give a false signal. However, since the time $T_1$ will not have elapsed, the sensing circuit will be rendered ineffective by the low output of the NOR gate 124. As soon as the time $T_1$ does elapse, then the diode 98 will discontinue its conducting, and the circuit 73 will be rendered operative. In the meantime the critical stage of operation (i.e. during the time between that corresponding to point $t$ and point $u$, where a false signal could occur) has passed and the circuit is ready to operate when the reset current is again sensed.

At the moment $d$ in, FIG. 2A, the commutating current flow has fallen to zero and for some time thereafter a reverse voltage exists across the rectifier 46 to shut it off. Overflow commutation current then immediately begins to flow along line 60 through the reset resistor 59 and diode 62, thereby providing an input to the current transformer 66 and a positive output to junction 91. The capacitor 96 immediately begins to charge through resistor 94 to thereby provide a delay to the enabling circuit by not allowing the junction 95 to immediately rise in voltage. The parameters of resistor 94 and capacitor 96 are chosen as to provide a time delay equal to the turnoff time of the commutating rectifier 46. Thus the voltage at junction 95 exceeds the threshold level at junction 102 at a time corresponding to the time of overflow current flow plus the predetermined turnoff time of the commutating rectifier, so as to switch the output 106 from a high to low state, and to cut off the lock-out pulse.

What I claim as new and desire to secure Letter Patent of the United States is:

1. In a commutation control apparatus for an inverter circuit comprising first and second load current carrying gate controlled rectifier means connected serially across a source of direct current electric power and first and second commutating gate controlled rectifier means serially connected across said source and commutating circuit means interconnecting the respective junctions of said load current carrying and of said commutating gate controlled rectifier means, said commutation control apparatus being responsive to applied inverter command signals for firing said gate controlled rectifier means in predetermined sequence and comprising:
   a. lock-out control means to inhibit firing of said second commutating rectifier means for a period of time commencing upon firing of said first commutating rectifier means and terminating upon the occurrence of a turnoff signal;
   b. commutating detection means for providing a commutation signal upon detection of a condition in said inverter circuit indicative of the application of a reverse voltage across said first commutating rectifier means to initiate its turnoff; and
   c. gating means coupled to said commutating detection means and responsive solely to a commutation signal occurring after a predetermined first time interval subsequent to firing said first commutating gate controlled rectifier means to produce said turnoff signal.

2. The arrangement of claim 1 wherein said first time interval is longer than the minimal time duration of commutating current flow subsequent to firing said first commutating gate controlled rectifier means.

3. The apparatus of claim 1 wherein said lock-out control means is arranged to terminate said inhibit period upon the expiration of a predetermined second time interval subsequent to firing said first commutating rectifier means in the absence of an earlier turnoff signal, said second time interval being longer than said first time interval.

4. The arrangement of claim 1, wherein said gating means comprises time delay means for delaying said turnoff signal for a predetermined turnoff interval subsequent to occurrence of said commutation signal.

5. The arrangement of claim 4 wherein said time delay means comprises unilateral conduction means connected to rapidly reset said time delay means upon removal of the reverse voltage across said first commutating rectifier means.

6. In a commutation control apparatus for an inverter circuit comprising first and second load current carrying gate controlled rectifier means connected serially across a source of direct current electric power and first and second commutating gate controlled rectifier means serially connected across said source and commutating circuit means interconnecting the respective junctions of said load current carrying and of said commutating gate controlled rectifier means, said commutation control apparatus being responsive to applied inverter command signals for firing saaid gate controlled rectifier means in predetermined sequence and comprising:
   a. commutating detection means for providing a commutation signal upon detection of a condition in said inverter circuit indicative of the application of a reverse voltage across said first commutating rectifier means to initiate its turnoff;
   b. gating means responsive to said commutation signal and adapted to provide at its output a turnoff signal occurring at a turnoff time interval subsequent to the occurrence of said commutation signal;
   c. lock-out signal means for generating a lock-out signal and responsive to said turnoff signal to switch the level of said lock-out signal from a first to a second state;
   d. lock-out circuit means for inhibiting firing of said second commutating recrifier means upon firing of said first commutating rectifier until such time as the state of said lock-out signal is switched from said first to said second state;
   e. pulse generating means for generating a predetermined output signal having a change of state upon expiration of a predetermined first time interval subsequent to firing of said first commutating rectifier means, and
   f. said gating means being responsive to said output signal and to said lock-out signal for applying said turnoff signal to said lock-out signal means exclusively in response to occurrence of a commutation signal during a gating time interval commencing upon said change of state of said output signal and terminating upon said lock-out signal being switched from said first to said second state.

7. The commutation control arrangement of claim 6 wherein said lock-out signal means is constructed so as to generate a lock-out signal whose level is switched from said first to a said second state at a predetermined lock-out pulse time interval subsequent to the firing of said first commutating rectifier means, which time interval is at least equal to the minimum safe time period required between the firings of said first and second commutating rectifier means, in the event a turnoff signal is not previously applied to said lock-out signal means during said predetermined lock-out time interval.

8. The arrangement of claim 7 wherein said lock-out circuit means comprises an input terminal adapted to be connected to a source of bilevel inverter command signals successively having first and second level states, said level states indicative of which of said commutating rectifier means is to be fired, means for coupling command signals of a first level state through a first gating means to fire said first commutating rectifier means and for coupling command signals of a second level state through a second gating means to fire said second commutating rectifier means, and means for coupling said lock-out signal to said first and second gating means to inhibit firing of said second commutating rectifier means subsequent to firing of said first commutating rectifying means until said lock-out signal is switched from said first to said second state.

9. The arrangement of claim 8 wherein in said inverter circuit said commutating circuit comprises capacitance and inductance means, and wherein first and second sets of serially connected diode rectifier means and resisitance means are connected, respectively, in parallel circuit relationship across said first and second commutating gate controlled rectifier means in reverse polarity therewith, said commutating detection means comprising current sensing means for sensing overcharge current flow in said diode rectifier means when its parallel connected commutating gate controlled rectifier means ceases conduction.

10. The arrangement of claim 9 wherein said current sensing means comprises transformer means having a primary winding connected in a circuit between the junction of said commutating detection means and a common junction of said first and second sets of diode rectifier means and resistance means.

11. The arrangement of claim 7 wherein said lockout signal means comprises pulse generating a lock-out pulse signal switched from said second to said first state substantially coincident with the firing of said first commutating rectifier means and switched from said first to said second state at the termination of said predetermined lock-out pulse time interval or at such earlier time as a turnoff signal is applied to said lock-out signal means, and said lock-out circuit means is constructed to inhibit firing of said second commutating rectifier means during the time interval when said lock-out signal is in said first state.

12. The arrangement of claim 11 wherein said pulse generating means provides a bilevel output pulse signal switched to one level state substantially coincident with the firing of said first commutating rectifier means and switched to another level state upon expiration of first time interval.

13. The arrangement of claim 12 wherein said gating means comprises a gating circuit respnsive to said lockout and output pulse signals and means coupled to the output of said gating circuit for inhibiting generation of a turnoff signal to said lock-out signal means except during the interval commencing upon said output pulse signal being switched to said another level state and terminating upon said lock-out pulse signal being switched from said first to said second state.

14. In a commutation control apparatus for an inverter circuit including at least one set of two series connected load current carrying gate controlled rectifiers connected across a source of direct current electric power, a respective set of two series connected commutating gate controlled rectifiers of similar polarity connected across said source of electric power and commutating curcuit means interconnecting the junction of said two load current carrying gate controlled rectifiers and the junction of said two commutating gate controlled rectifiers, wherein said commutating control apparatus alternately gates one and the other of said commutating rectifiers responsive to applied inverter command signals and comprises lock-out means responsive to a lock-out pulse for inhibiting premature firing of said other commutating rectifier, lock-out pulse generating means comprising:

a. first monostable pulse generating means having a trigger input and an output adapted to provide a first output pulse signal commencing upon application of a trigger input signal and having a predetermined time duration;

b. second monostable pulse generating means having a trigger input and a second input, and an output adapted to provide a lock-out pulse signal commencing upon application of a trigger input signal and terminating upon expiration of a time duration equal at least to the minimum safe time period required between firing of said one and said other cummutating rectifier, unless terminated at such earlier time when a cutoff signal is applied to said second input;

c. means for applying a trigger signal to the trigger inputs of said first and second pulse generating means substantially concurrently with the firing of said one commutating rectifier;

d. coupling means for coupling the lock-out pulse output of said second pulse generating means to said lock-out means to inhibit firing of said other commutating rectifier during the duration of said lock-out pulse;

e. commutating detection means for producing at its output a commutation signal upon the application of a reverse voltage across said one commutating gate controlled rectifier means to initiate its turnoff;

f. time delay means adapted to produce a turnoff signal at a predetermined turnoff time interval subsequent to the occurrence of said commutation signal;

g. gating means responsive solely during a gating time interval commencing upon termination of said first output pulse signal and ending upon termination of said lock-out pulse signal for applying a signal coincident in time with said turnoff signal, to the second input of said second pulse generating means to terminate said lock-out pulse signal and to enable subsequent firing of said other commutating rectifier.

15. The arrangement of claim 14 wherein said gating means comprises a switching circuit coupled to the outputs of said first and second pulse generating means to produce a switching circuit output signal of a first state during said gating time interval and a signal of a second state during all other time intervals, and inhibit means for inhibiting generation of a turnoff signal when the switching circuit output signal is of a second state.

16. The arrangement of claim 15 wherein said time delay circuit comprises a resistance-capacitance network connected serially across the output of said commutating detection means and adapted to provide a turnoff voltage signal across the capacitance portion of said network, said inhibit means comprising first unilaterally conducting means coupling said switching circuit output to the circuit junction of said capacitance and resistance portions, said first unilaterally conducting means being poled such that the junction is clamped to a predetermined voltage level during intervals when the switching circuit output is of a second state so as to inhibit generation of a turnoff signal.

17. The arrangement of claim 16 further comprising second unilaterally conducting means connected to rapidly discharge said capacitance upon generation of said turnoff voltage signal.

18. The arrangement of claim 17 wherein said junction is coupled to an input of a second switching circuit having an output coupled to the second input of said second pulse generating means, said second switching circuit being biased to switch the state of its output signal coincident with the attainment of a predetermined level of the turnoff voltage signal at said junction.

19. In combination: an inverter circuit comprising first and second load current carrying gate controlled rectifier means connected serially between a pair of direct current electric power terminals, first and second commutating gate controlled rectifier means of similar polarity serially connected between said terminals, feedback rectifier means connected across said load current carrying gate controlled rectifier means in reversely poled relationship therewith, and oscillatory commutating circuit means interconnecting the respective junctions of said load current carrying and of said commutating gate controlled rectifier means; and commutation control apparatus responsive to applied inverter command signals for firing said gate controlled rectifier means in predetermined sequence said commutation control apparatus including lock-out means effective with the firing of said first commutating rectifier means for inhibiting a premature subsequent firing of said second commutating rectifier means, said lock-out means comprising;
  a. reverse voltage detecting means for sensing the presence of a discrete signal in said inverter whose presence is indicative of the application of reverse voltage to said first commutating rectifier means;
  b. timing means responsive to the sensing of said discrete signal and operative to produce a turnoff signal after said reverse voltage condition has continued for a fixed delay interval; and
  c. control means responsive to an inverter command signal which initiates firing of said first commutating rectifier means for commencing an inhibit period throughout which firing of said second commutating rectifier means is prevented, said control means also being responsive to the production of said turnoff sibnal by said timing means for terminating said inhibit period.

20. The combination of claim 19 wherein said inverter curcuit additionally comprises reset circuit means comprising first and second unilaterally conducting rectifying means which, in series with damping resistance, are connected in parallel circuit, reversely poled relationship with said first and second commutating gate controlled rectifier means, respectively, and wherein said reverse voltage detecting means comprises means for directly sensing curent which flows in said reset circuit means when said first commutating rectifier means in reverse biased.

21. The combination of claim 20 wherein said means for directly sending current flow comprises sensing means connectd in series circuit intermediate the junction of said first and second commutating rectifier means and a common point in said reset circuit means between said first and second unilaterally conducting rectifying means.

22. The combination of claim 21 wherein said sensing means comprises the primary winding of a transformer whose secondary winding is coupled to detecting means.

23. The combination of claim 19 in which said timing means is rapidly reset in response to an interruption of said reverse voltage condition prior to the expiration of said fixed delay interval.

24. The combination of claim 19 wherein said lock-out means further comprises additional timing means for automatically terminating said inhibit period, if not earlier terminated by said turnoff signal, upon the expiration of a predetermined maximum interval of time after the firing of said first commutating recitifier means is initiated.

25. The combination of claim 19 wherein said lock-out means further comprises additional timing means for preventing any termination of said inhibit period before the expiration of a predetermined minimum interval of time after the firing of said first commutating rectifier means is initiated.

26. The combination of claim 25 wherein said additional timing means is effective to render the first-mentioned timing means inoperative for a predetermined first time interval, thereby ensuring that no turnoff signal can be produced before the expiration of said minimum interval of time.

27. The combination of claim 25 wherein said lock-out means also comprises third timing means for automatically terminating said inhibit period, if not earlier terminated by said turnoff signal, upon the expiration of a predetermined maximum interval of time after the firing of said first commutating rectifier means is initiated.

* * * * *

UNITED STATES PATENT OFFICE
CERTIFICATE OF CORRECTION

PATENT NO. : 3,919,620
DATED : Nov. 11, 1975
INVENTOR(S) : W. McMurray et al

Page 1 Of 4

It is certified that error appears in the above-identified patent and that said Letters Patent are hereby corrected as shown below:

Column 5, line 2, "posiive" should be corrected to -- positive --

Column 5, line 67, "recied" should be corrected to -- recited --

Column 7, line 24, "secondnary" should be corrected to -- secondary --

Column 7, line 67, "provided" should be corrected to -- provides --

Column 8, line 19, delete "if" and substitute -- it --

Column 8, line 21, delete "at" and substitute -- as --

Column 8, line 24, delete "if" and substitute -- of --

Column 8, line 59, "sill" should be corrected to -- still --

Column 9, line 7, insert "of" between "firing" and "load"

Column 11, line 30, delete "pule" and substitute -- pulse --

Column 11, line 46, "mxaimum" should be corrected to -- maximum --

Column 11, line 48, "minum" should be corrected to -- minimum --

Column 12, line 29, delete "is" (second occurrence) and substitute -- in --

Column 12, line 56, "Q" should be corrected to -- $\overline{Q}$ --

UNITED STATES PATENT OFFICE
CERTIFICATE OF CORRECTION

PATENT NO. : 3,919,620
DATED : Nov. 11, 1975
INVENTOR(S) : W. McMurray et al

Page 2 of 4

It is certified that error appears in the above-identified patent and that said Letters Patent are hereby corrected as shown below:

Column 13, line 4, "Q" should be corrected to -- $\overline{Q}$ --

Column 13, line 7, "Q" should be corrected to -- $\overline{Q}$ --

Column 13, line 21, "Q" should be corrected to -- $\overline{Q}$ --

Column 13, line 39, "Q" (second occurrence) should be corrected to -- $\overline{Q}$ --

Column 13, line 45, "Q" should be corrected to -- $\overline{Q}$ --

Column 14, line 5, "Q" should be corrected to -- $\overline{Q}$ --

Column 14, line 8, delete "said" and substitute -- and --

Column 14, line 16, "Q" (second occurrence) should be corrected to -- $\overline{Q}$ --

Column 14, line 16, "Q" (fourth occurrence) should be corrected to -- $\overline{Q}$ --

UNITED STATES PATENT OFFICE
CERTIFICATE OF CORRECTION

PATENT NO. : 3,919,620
DATED : Nov. 11, 1975
INVENTOR(S) : W. McMurray

Page 3 of 4

It is certified that error appears in the above-identified patent and that said Letters Patent are hereby corrected as shown below:

Column 14, line 22, "Q" (second occurrence) should be corrected to -- $\overline{Q}$ --

Column 14, line 24, "imput" should be corrected to -- input --

Column 14, line 46, delete "rectifier" and substitute -- begins --

Column 14, line 48, delete "the" and substitute -- line --

Column 14, line 51, "Q" should be corrected to -- $\overline{Q}$ --

Column 14, line 53, "Q" should be corrected to -- $\overline{Q}$ --

Column 16, line 34, "saaid" should be corrected to -- said -- .

Column 16, line 52, "recrifier" should be corrected to -- rectifier --

Column 17, line 33, "resisitance" should be corrected to -- resistance --

UNITED STATES PATENT OFFICE
CERTIFICATE OF CORRECTION

PATENT NO. : 3,919,620

DATED : Nov. 11, 1975

INVENTOR(S) : W. McMurray et al

Page 4 of 4

It is certified that error appears in the above-identified patent and that said Letters Patent are hereby corrected as shown below:

Column 17, line 48, between "generating" and "a", insert -- means generating --

Column 17, line 66, "respnsive" should be corrected to -- responsive --

Column 19, line 48, delete ";" and substitute -- : --

Column 20, line 4, "sibnal" should be corrected to -- signal --

Column 20, line 14, "curent" should be corrected to -- current --

Column 20, line 16, delete "in" and substitute -- is --

Column 20, line 18, delete "sending" and substitute -- sensing --

Signed and Sealed this twenty-seventh Day of April 1976

[SEAL]

Attest:

RUTH C. MASON
*Attesting Officer*

C. MARSHALL DANN
*Commissioner of Patents and Trademarks*